(12) United States Patent (10) Patent No.: US 8,678,518 B2
Rivera et al. (45) Date of Patent: Mar. 25, 2014

(54) WHEEL MOUNTING ASSEMBLY

(75) Inventors: Ernesto Camilo Rivera, Erie, PA (US); Augusto Jurado, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/300,319

(22) Filed: Nov. 18, 2011

(65) Prior Publication Data

US 2012/0062020 A1 Mar. 15, 2012

Related U.S. Application Data

(62) Division of application No. 12/250,642, filed on Oct. 14, 2008, now abandoned.

(60) Provisional application No. 60/981,792, filed on Oct. 22, 2007.

(51) Int. Cl.
  *B60B 11/06* (2006.01)
  *B60B 27/02* (2006.01)
  *B60B 23/00* (2006.01)

(52) U.S. Cl.
  USPC ............ 301/13.2; 301/36.1; 301/105.1

(58) Field of Classification Search
  USPC ......... 301/105.1, 10.1, 11.1, 13.1, 13.2, 36.1, 301/35.628
  See application file for complete search history.

(56) References Cited

U.S. PATENT DOCUMENTS

| | | | | |
|---|---|---|---|---|
| 1,521,661 A | * | 1/1925 | Walther | 301/13.1 |
| 1,809,699 A | * | 6/1931 | Higbee | 301/36.2 |
| 1,887,544 A | * | 11/1932 | Codd | 301/36.3 |
| 1,976,068 A | * | 10/1934 | Higbee | 301/1 |
| 2,386,917 A | | 10/1945 | Thornton | |
| 2,635,012 A | * | 4/1953 | Rappaport | 301/36.1 |
| 3,042,145 A | | 7/1962 | Bixby | |
| 3,951,481 A | | 4/1976 | Ritter, Jr. | |
| 4,873,894 A | * | 10/1989 | Avery et al. | 475/334 |
| 7,252,348 B2 | * | 8/2007 | Gingras | 305/136 |
| 2005/0218720 A1 | * | 10/2005 | Gingras | 305/136 |

FOREIGN PATENT DOCUMENTS

| | | |
|---|---|---|
| CN | 2507693 Y | 8/2002 |
| RU | 2221704 C2 | 1/2004 |

OTHER PUBLICATIONS

Office Action from corresponding Chinese Patent Application No. 200880113424.1, dated Jan. 11, 2012.
Unofficial English translation of Office Action from EA dated Jun. 22, 2013.

* cited by examiner

*Primary Examiner* — Kip T Kotter
(74) *Attorney, Agent, or Firm* — General Electric Company; John A. Kramer (57) ABSTRACT

A wheel assembly includes: (a) a hub adapted to be mounted for rotation about an axis and defining a housing for enclosing a gear set, the hub having a generally cylindrical outer surface; (b) a ring surrounding the outer surface of the hub; and (c) a generally cylindrical rim surrounding at least a portion of the hub, the rim adapted to carry a tire and having a radially inwardly extending mounting flange. The mounting flange is fastened to the ring.

2 Claims, 12 Drawing Sheets

WHEEL MOUNTING ASSEMBLY

CROSS-REFERENCE TO RELATED APPLICATIONS

This application is a divisional of U.S. patent application Ser. No. 12/250,642, filed Oct. 14, 2008, now abandoned which claims the benefit of U.S. Provisional Application No. 60/981,792 filed Oct. 22, 2007.

BACKGROUND OF THE INVENTION

This invention relates generally to off-highway vehicles and other heavy vehicles and more particularly to means for mounting the wheels of such vehicles.

Many large vehicles, especially off-highway vehicles such as dump trucks and other wheeled mining equipment, use a hub containing a geared final drive or transmission. One or more wheels (also called "rims") are mounted to this hub. For maximum torque capability and durability, it is desirable to make the transmission components as large as possible while still fitting into the hub. In the prior art, the rims have been mounted so that it is possible to install and remove them conveniently. Unfortunately, this design encroaches on the space available for the transmission components and limits their size.

BRIEF SUMMARY OF THE INVENTION

These and other shortcomings of the prior art are addressed by the present invention, which provides several configurations for mounting tire-carrying rims to a wheel hub.

According to one aspect of the invention, a wheel assembly includes: (a) a hub adapted to be mounted for rotation about an axis and defining a housing for enclosing a gear set, the hub having a generally cylindrical outer surface; (b) a ring surrounding the outer surface of the hub; and (c) a generally cylindrical rim surrounding at least a portion of the hub, the rim adapted to carry a tire and having a radially inwardly extending mounting flange. The mounting flange is fastened to the ring. By "surrounding," it is meant extending around, e.g., the ring extends around the outer surface of the hub.

According to another aspect of the invention, a wheel assembly includes: (a) a hub adapted to be mounted for rotation about an axis, the hub defining a housing for enclosing a gear set and having an inboard end and an outboard end carrying respective inboard and outboard flanges, where at least the outboard flange is segmented; and (b) a generally cylindrical first rim surrounding at least a portion of the hub, the first rim being adapted to carry a tire and having a radially inwardly extending mounting flange. The mounting flange of the first rim is segmented in a complementary relationship to the outboard flange and is fastened to the inboard flange.

According to another aspect of the invention, a wheel assembly includes: (a) a hub adapted to be mounted for rotation about an axis and defining a housing for enclosing a gear set, the hub having a generally cylindrical outer surface; and (b) a generally cylindrical first rim surrounding the hub and at least a portion of the hub, the first rim being adapted to carry a tire and having a first mounting flange extending axially therefrom. The first rim is fastened to the hub with at least one fastener extending through the first mounting flange and oriented in a generally radial direction.

According to another aspect of the invention, a wheel assembly includes: (a) a hub adapted to be mounted for rotation about an axis, the hub having a generally cylindrical outer surface; (b) a hollow annular transmission housing carried by and extending axially away from the hub, the transmission housing including: (i) an inboard section having a first outside diameter; (ii) an outboard section having a second outside diameter substantially greater than the first diameter; and (iii) a transition section interconnecting the inboard and outboard sections; (c) an annular adapter ring fastened to the hub and the transmission housing by a first mechanical connection; and (d) a generally cylindrical rim surrounding the transmission housing and at least a portion of the hub, the rim being adapted to carry a tire and having a radially inwardly extending mounting flange which is fastened to the adapter ring by a second mechanical connection. An annular space is defined between the rim and the transmission housing such that the mechanical connections are physically accessible from an outboard end of the transmission housing.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
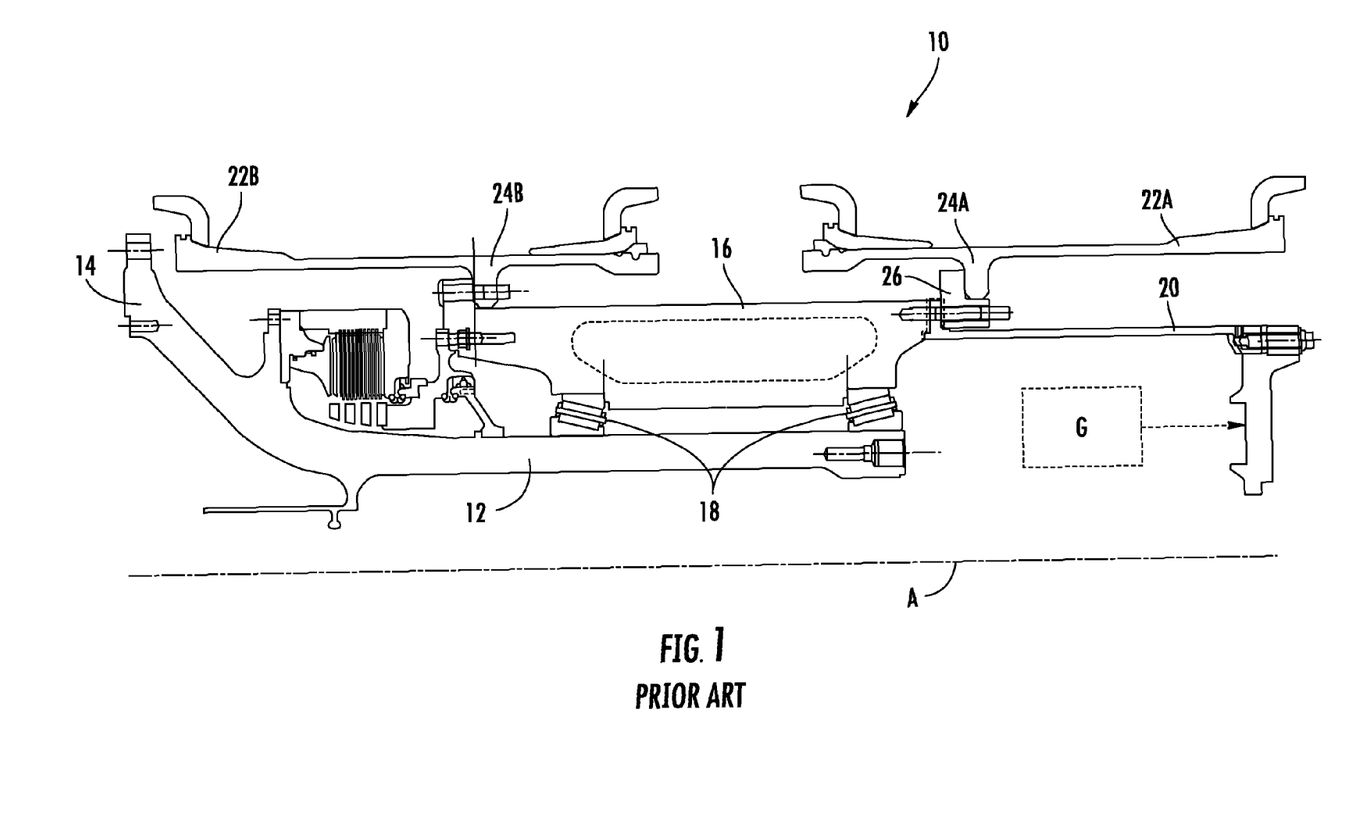
FIG. 1 is a schematic cross-sectional view of a prior art wheel assembly.
Figure 2:
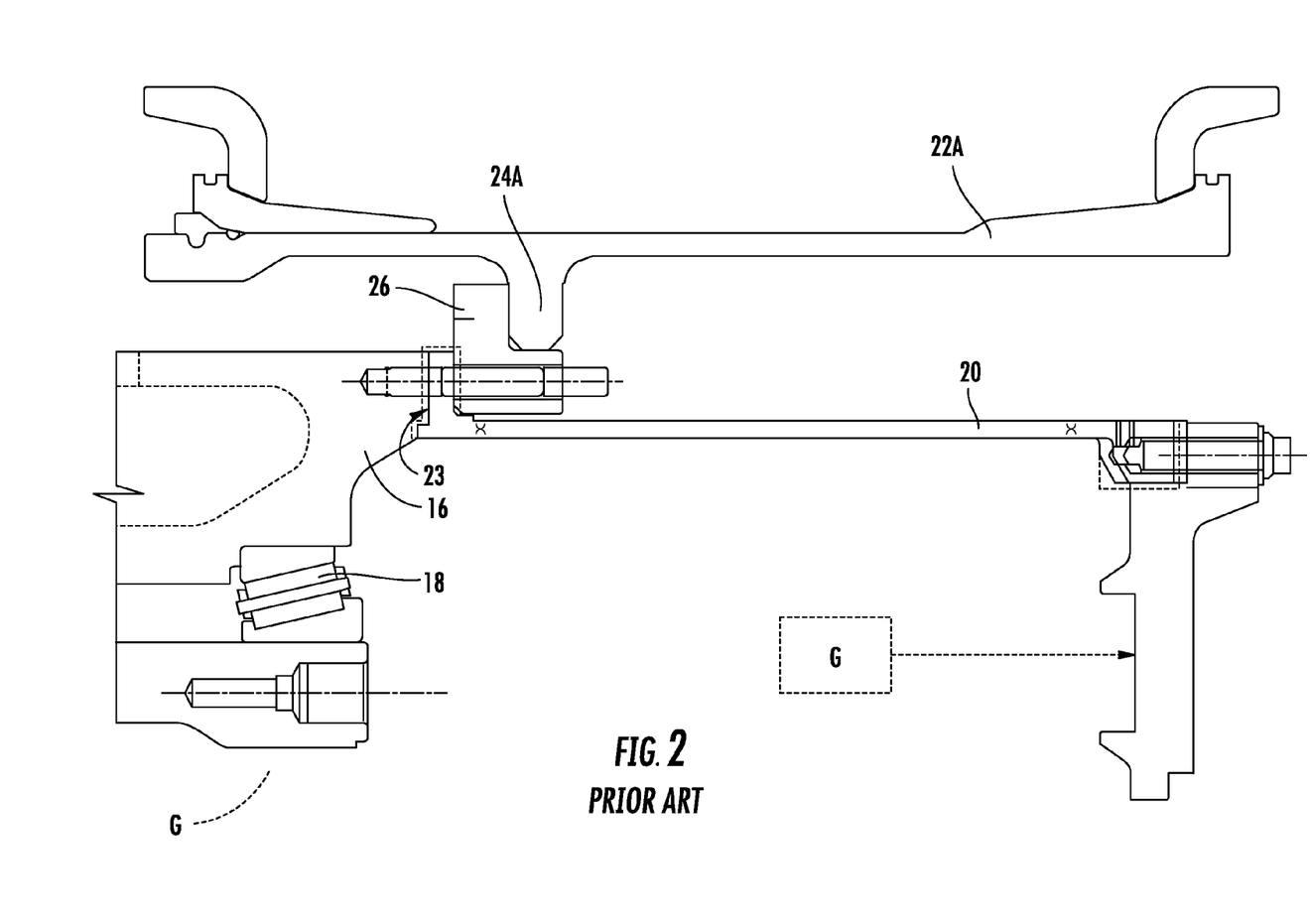
FIG. 2 is an enlarged view of a portion of FIG. 1.

Referring to the drawings wherein identical reference numerals denote the same elements throughout the various views, FIGS. 1 and 2 depict a prior art wheel assembly 10 of the type used for mining dump trucks and other off-highway vehicles. The wheel assembly 10 is shown in half-section, with the understanding that the components are bodies of revolution about the axis "A". As used herein, the term "axial"

refers generally to a direction parallel to the axis A, and the term "radial" refers generally to a direction perpendicular to the axis A. A frame 12 includes a flange 14 or other means for being mounted to the vehicle (not shown) and extends outwardly from the vehicle. A wheel hub (or simply "hub") 16 is mounted for rotation on the frame 12 by bearings 18. A generally cylindrical transmission housing 20 is fastened to the outboard end of the wheel hub. As used herein, the term "generally cylindrical" refers to a shape which is primarily a body of revolution about an axis, which may include one or more tapered sections, protrusions (such as flanges or ridges), negative machined features (such as circumferential grooves or axial splines), holes, non-axisymmetrical features, and the like. A transmission or gear set of a known type, for example a multi-stage planetary gear set is carried within the transmission housing 20 and is operably connected to the hub 16 so as to transmit torque from a source, such as a driveshaft or an electric traction motor, to the hub 16. For illustrative clarity the gear set is only shown schematically at "G". It will be understood that the design of the present invention is equally useful for mounting wheels which use varying types of gear sets, or no gear set at all. One or more wheels (also referred to as "rims") are mounted to the hub 16. In the illustrated example an outboard rim 22A and an inboard rim 22B are shown. Each rim 22 has provisions for mounting a tire and an inwardly-extending mounting flange 24A and 24B, respectively.

As seen most clearly in FIG. 2, an adapter ring 26 is bolted to the outer end of the hub 16, and the outboard rim 22A is bolted to the adapter ring 26. This is necessary to provide radial clearance so that the inboard rim 22B can be installed or removed. Unfortunately, when a mounting surface is provided on the hub 16 for the adapter ring 26, it limits the outside diameter of the transmission housing 20, which in turn limits the size of the components of the transmission therein.

Figure 3:
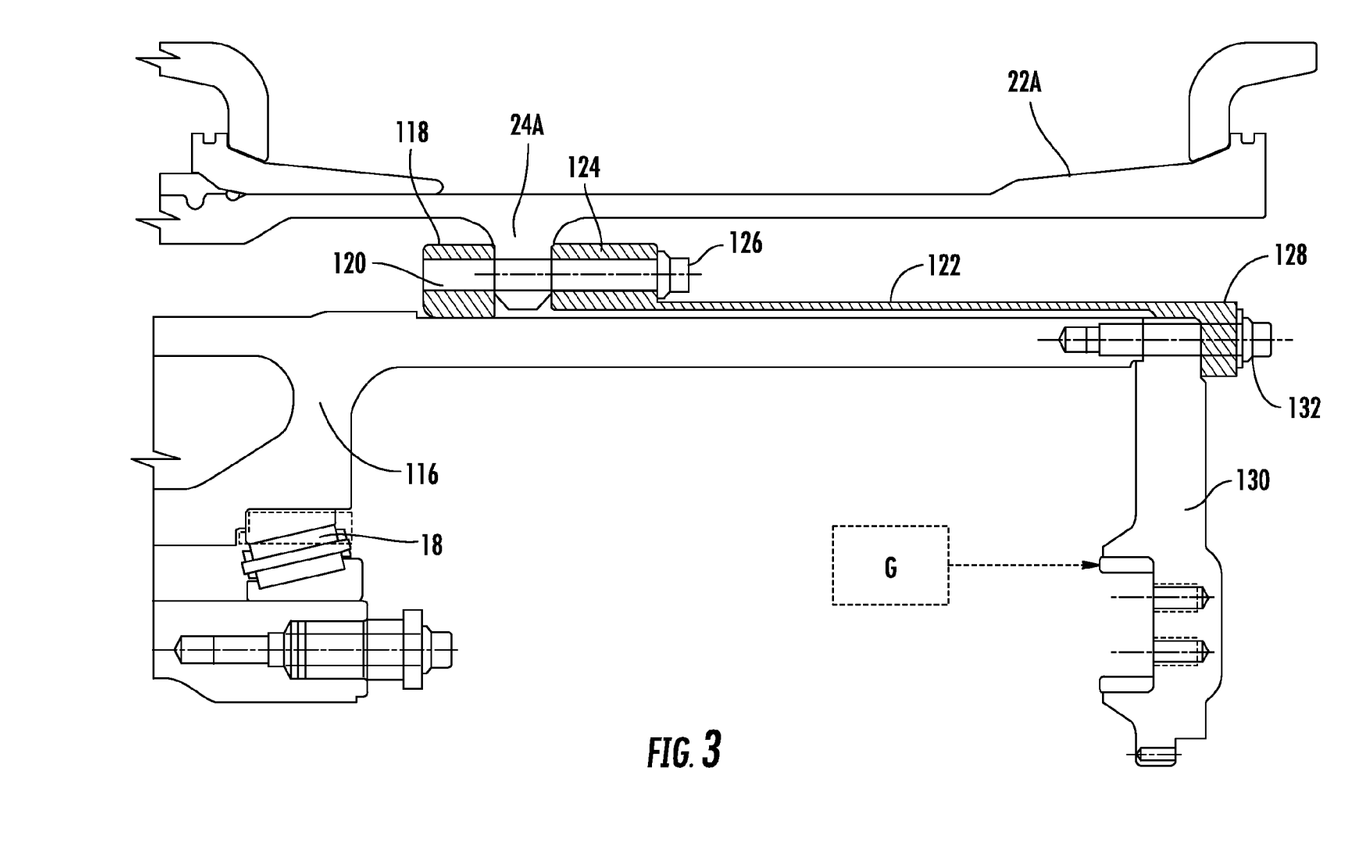
FIG. 3 is a schematic cross-sectional view of a wheel assembly, showing a configuration for mounting a rim thereto according to an aspect of the present invention.

FIG. 3 illustrates a first configuration for mounting a rim to a hub 116. FIG. 2 illustrates the outboard rim 22A, with the understanding that the inboard rim (not shown) would be mounted in conventional fashion as shown in FIG. 1. A ring 118 with an array of axially-extending threaded holes 120 is placed around the hub 116. It is held in place, for example, by an optional press fit between its inner diameter and the outer diameter of the hub 116. Unlike the prior art hub 16, the hub 116 maintains its maximum outer diameter all the way out to its outboard end. In this particular example the hub 116 is elongated and defines a space for enclosing a gear set G, such that no separate transmission housing is required. The mounting flange 24A of the outboard rim 22A abuts the ring 118. A generally cylindrical sleeve adapter 122 has an inner flange 124 at its inboard end that is mechanically fastened (e.g., with bolts 126) to the ring 118 to clamp the outboard rim 22A. An outer flange 128 of the sleeve adapter 122 is fastened to the hub 116 and/or an end plate 130 (e.g., with bolts 132). In operation, the ring 118 carries radial loads from the outboard rim 22A. The sleeve adapter 122 transmits torque from the end plate 130 to the outboard rim 22A, and transmits radial loads to the hub 116. The sleeve adapter 122 also assists with installation and removal of the outboard rim 22A. For example, bolts or other tooling inserted through the holes in the outer flange 128 can be used to press the rim/ring pair into place. Additional threaded holes may be provided in the outer flange 128 so that bolts (not shown) can be screwed in to bear against the end plate 130 and jack the sleeve/ring/rim combination out of hub 116.

Figure 4:
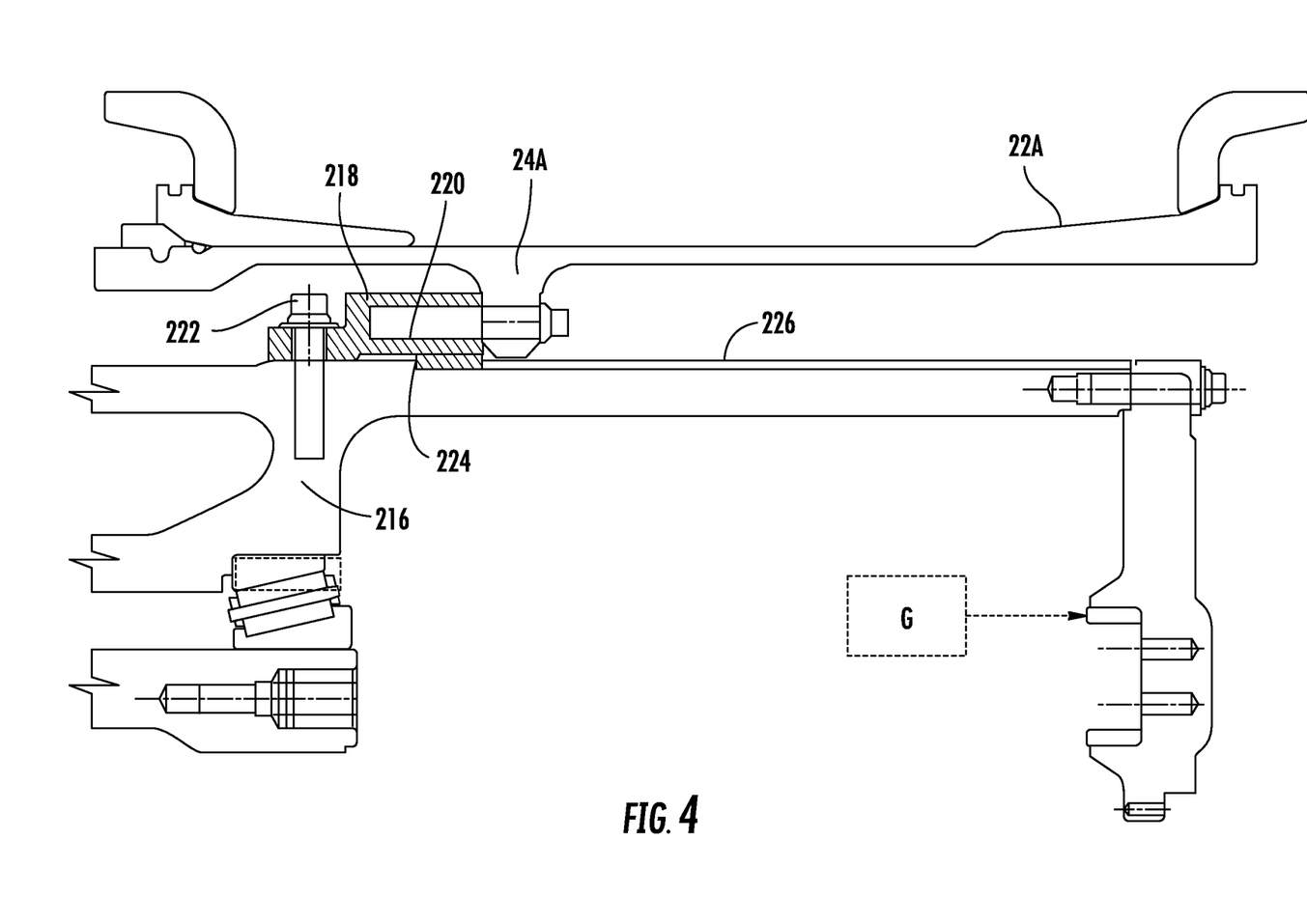
FIG. 4 is a schematic cross-sectional view of an alternative wheel assembly, showing a configuration for mounting a rim thereto according to another aspect of the present invention.
Figure 5:
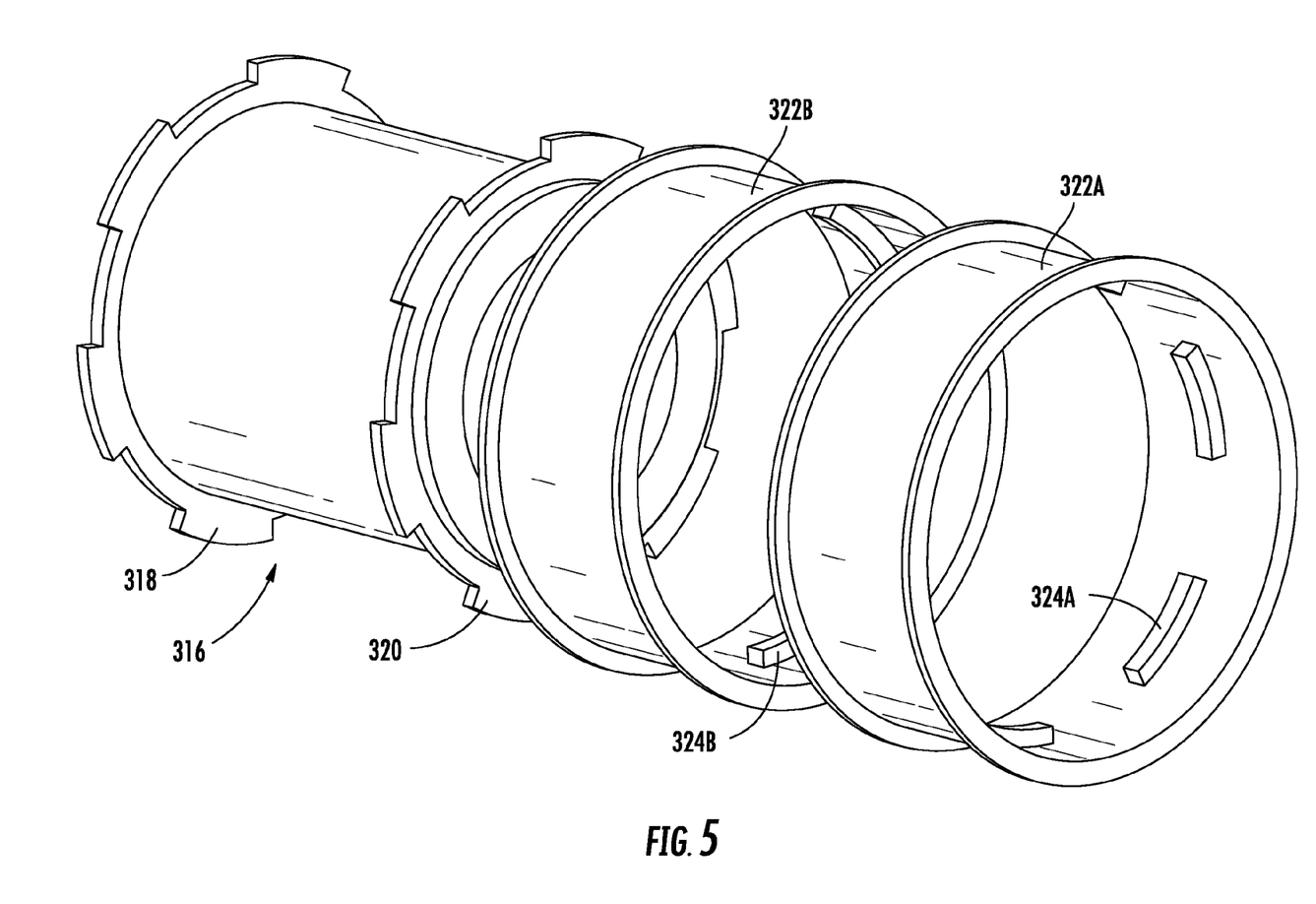
FIG. 5 is a schematic, exploded perspective view of a wheel assembly, showing a configuration for mounting a rim to a hub according to another aspect of the present invention.
Figure 6:
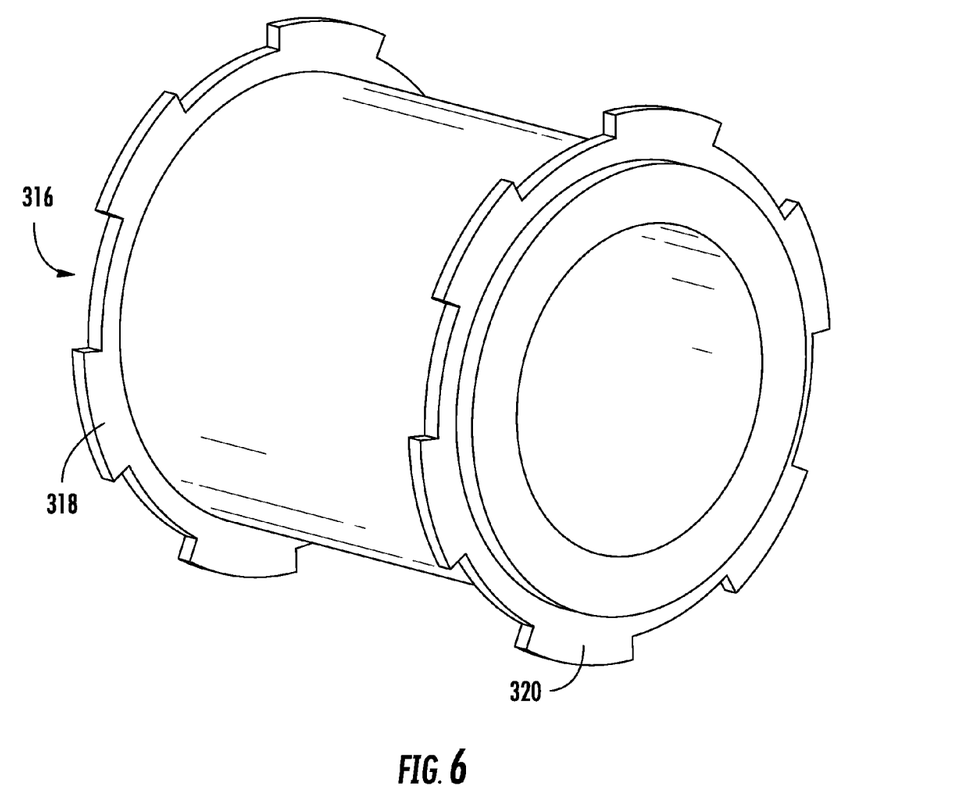
FIG. 6 is a schematic perspective view of a hub shown in FIG. 5.
Figure 7:
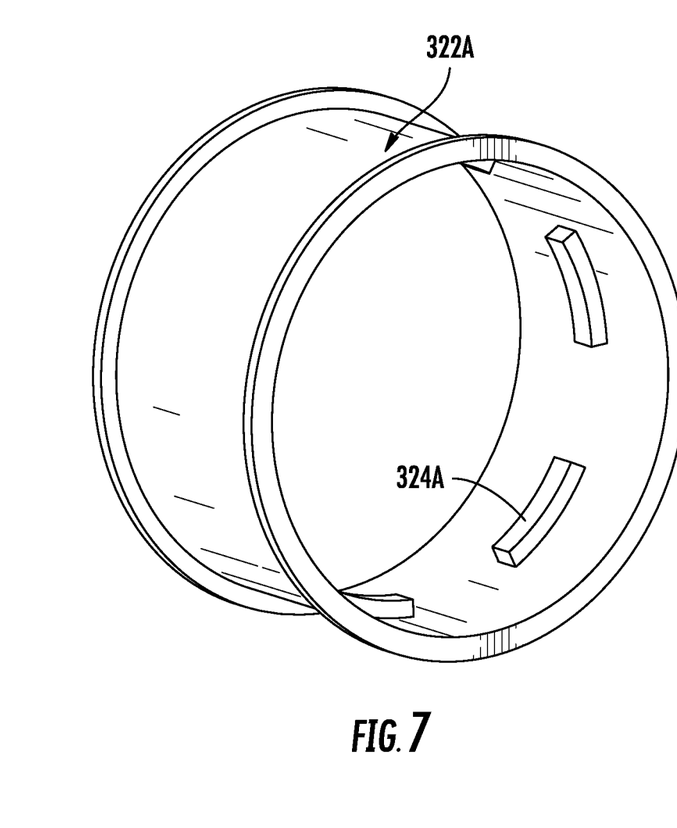
FIG. 7 is a schematic perspective view of a rim shown in FIG. 5.
Figure 8:
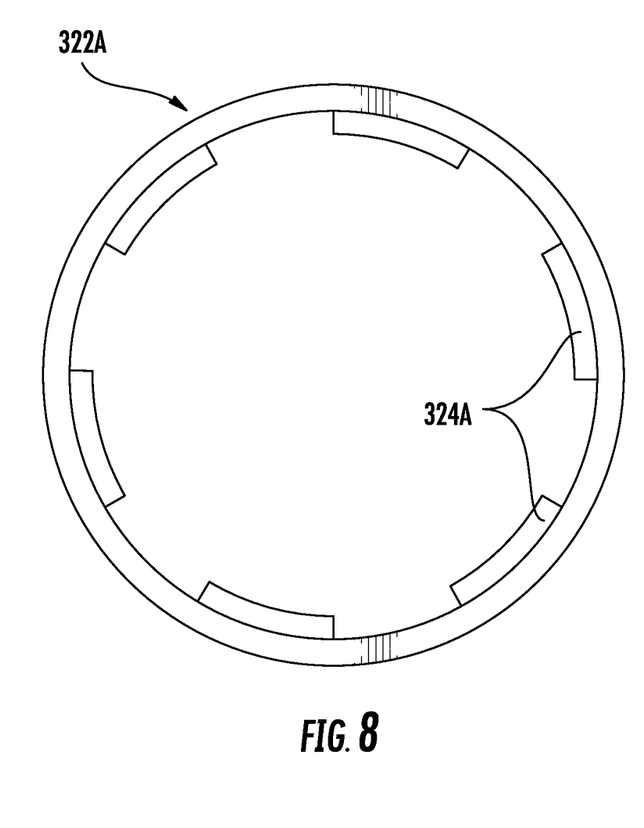
FIG. 8 is an end view of the rim shown in FIG. 7.
Figure 9:
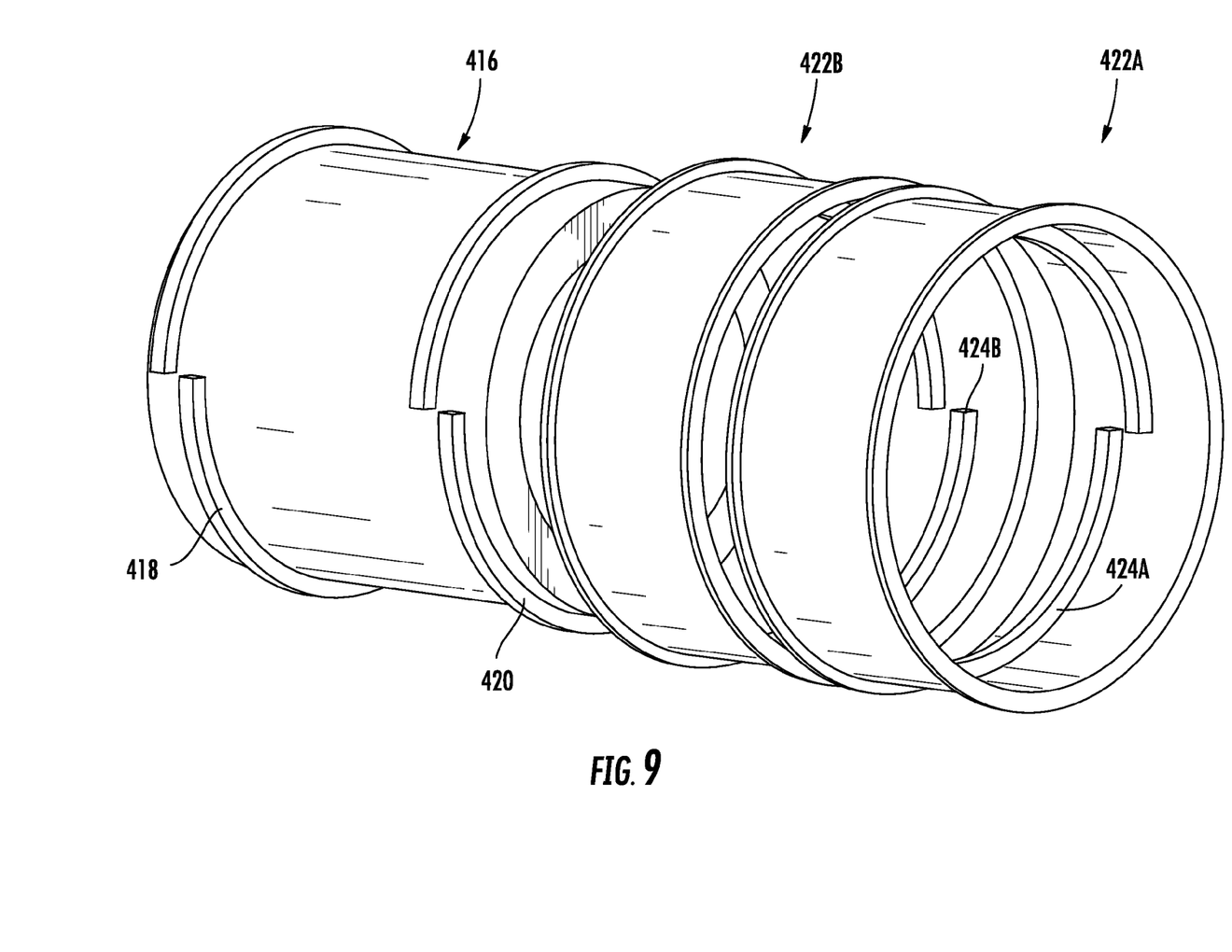
FIG. 9 is a schematic, exploded perspective view of a wheel assembly, showing a configuration for mounting a rim to a hub according to another aspect of the present invention.
Figure 10:
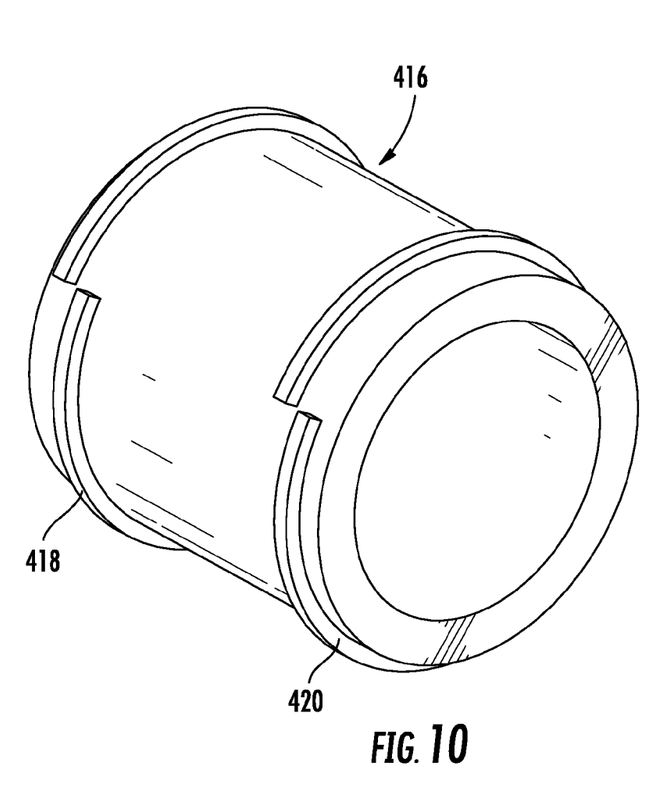
FIG. 10 is a schematic perspective view of a hub shown in FIG. 9.
Figure 11:
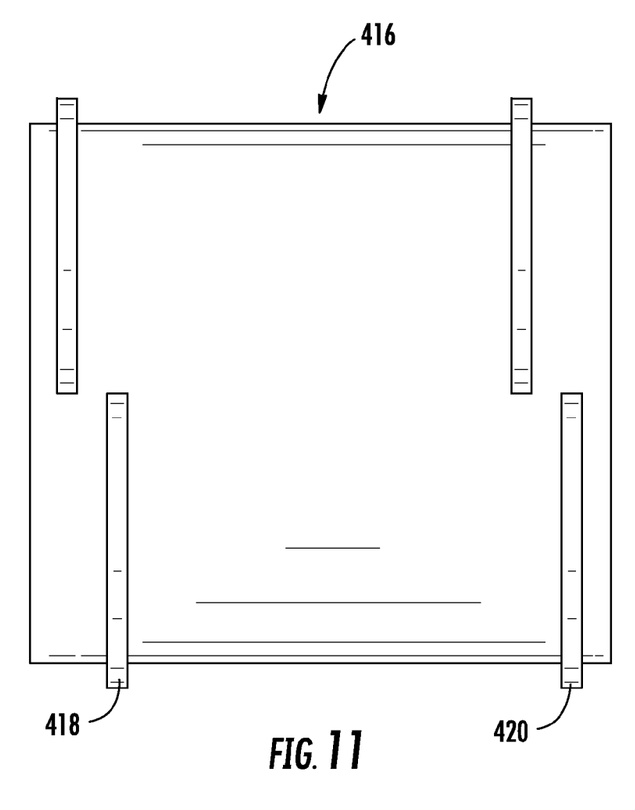
FIG. 11 is a schematic side view of the hub shown in FIG. 9.
Figure 12:
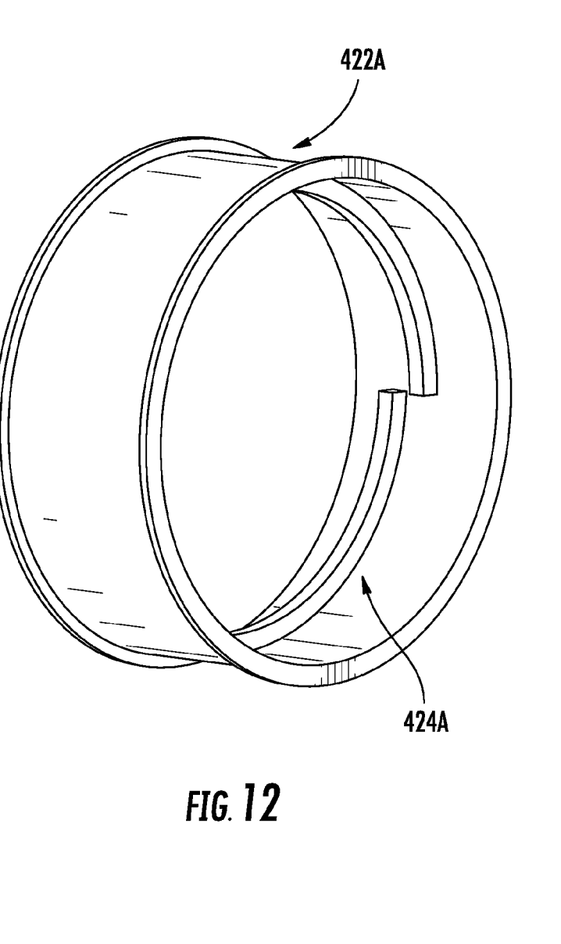
FIG. 12 is a schematic perspective view of a rim shown in FIG. 9.
Figure 13:
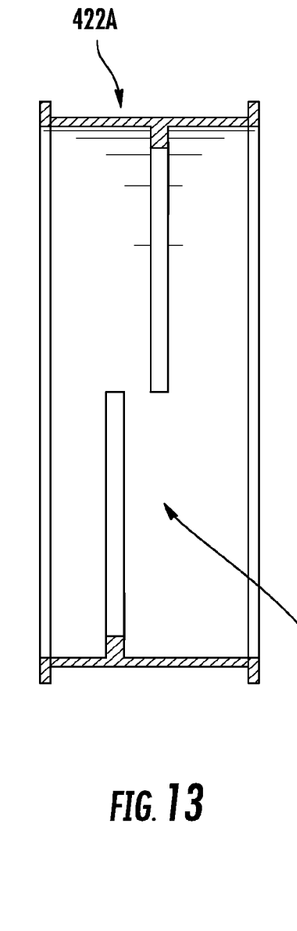
FIG. 13 is a cross-sectional view of the rim shown in FIG. 9.
Figure 14:
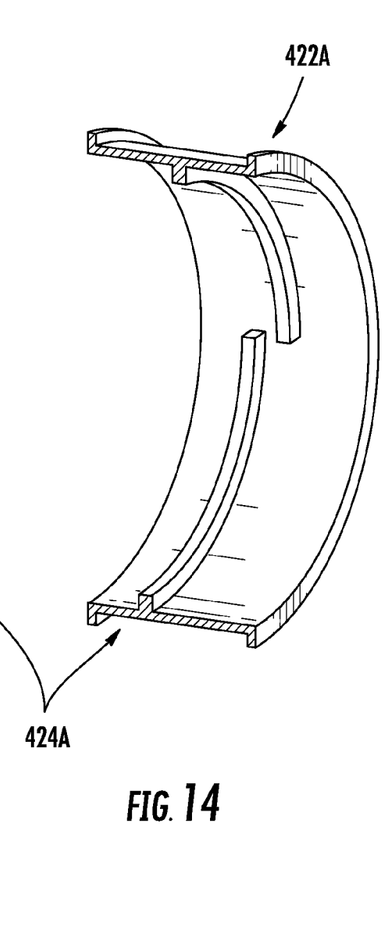
FIG. 14 is a cut-away perspective view of the rim shown in FIG. 9.

FIG. 4 illustrates a second configuration for mounting a rim to a hub 216 similar to the prior art hub 16. FIG. 4 illustrates the outboard rim 22A, with the understanding that the inboard rim (not shown) would be mounted in conventional fashion as shown in FIG. 1. A ring 218 with an array of axially-extending threaded holes 220 is placed around the hub 216. The ring 218 may be continuous, split, or segmented, and there may be a press fit between the ring 218 and the hub 216 if the ring 218 is continuous. In the illustrated example, the ring 218 is held in place by one or more rows of radially-aligned bolts 222 extending into the hub 216. The ring 218 may be provided with an anti-rotation feature, such as the illustrated spline 224 which is received in a keyway 226 of the hub 216. The opposite configuration of spline and keyway could be used as well. Unlike the prior art hub 16, the hub 216 maintains its maximum outer diameter all the way out to its outboard end. In this particular example the hub 216 is elongated and defines a space for enclosing a gear set G such that no separate transmission housing is required, but a separate transmission housing could be used. The mounting flange 24A of the outboard rim 22A abuts the ring 218, and is fastened thereto (e.g., with bolts). In operation, the ring 218 transmits torque and radial loads between the outboard rim 22A and the hub 216.

FIGS. 5-8 illustrate a third configuration for mounting a rim to a hub 316, which is similar in construction to the prior art hub 16. The hub 316 includes an inboard flange 318 and an outboard flange 320. Unlike the prior art hub 16, the hub 316 maintains its maximum outer diameter all the way out to its outboard. In this particular example the hub 316 is elongated and defines a space for enclosing a gear set such that no separate transmission housing is required. The inboard rim 322B includes a mounting flange 324B which is fastened to the inboard flange 318 (e.g., with bolts) and the outboard rim 322A includes a mounting flange 324A which is fastened to the outboard flange 320 (e.g., with bolts).

At least the outboard flange 320 and the mounting flange 324B of the inboard rim 322B are segmented, as illustrated. The inboard flange 318 and the mounting flange 324A of the outboard rim 322A do not need to be segmented. The segmentation of the outboard flange 320 and the mounting flange 324B allows the inboard rim 322B to slide over the outboard flange 320, in order to bolt the inboard rim 322B to the inboard flange 318. The segmentation of the outboard flange 320 and the inboard mounting flange 324B is complementary, and could have any number of segments and do not need to be identical to each other. Also, neither the rims nor the mounting flanges need to be identical to each other, as long as the complementary relationship is maintained between outboard flange 320 and the inboard mounting flange 324B. In operation, torque and radial loads are transferred directly between the hub 316 and the outboard and inboard rims 322A and 322B via the inner and outer flanges 318 and 320.

FIGS. 9-14 illustrate a fourth configuration for mounting a rim to a hub 416, which is similar in construction to the prior art hub 16. The hub 416 includes an inboard flange 418 and an outboard flange 420. Unlike the prior art hub 16, the hub 416 maintains its maximum outer diameter all the way out to its outboard end. In this particular example the hub 416 is elongated and defines a space for enclosing a gear set such that no separate transmission housing is required, but a separate transmission housing could be used. The inboard rim 422B includes a mounting flange 424B which is fastened to the inboard flange 418 (e.g., with bolts) and the outboard rim 422A includes a mounting flange 422A which is fastened to the outboard flange 420 (e.g., with bolts).

At least the outboard flange 420 and the mounting flange 424B of the inboard rim 422B are segmented, as illustrated. The segments on the flanges and rims are also shifted or offset into different axial planes as well as being circumferentially segmented. The inboard flange 418 and the mounting flange 424A of the outboard rim 422A do not need to be segmented. However, if they are not segmented/split the assembly will require one or more spacers or adapters to allow proper fastening of the outboard rim 424A to the outboard flange 420. The segmentation of the outboard flange 420 and the mounting flange 424B allows the inboard rim 422B to slide over the outboard flange 420, in order to bolt the inboard rim 422B to the inboard flange 418. The segmentation is configured such that the inboard rim 422B can reach the inboard flange 418 by axial displacement and rotation about the hub axis. The number and size of segments in both the rims 422A, 422B and the hub flanges 418, 420 is such that when combined with the number of planes used for segmentation allows the inboard rim 422A to move axially with some rim rotation about the hub axis.

The segmentation of the outboard flange 420 and the inboard mounting flange 424B could have any number of segments and do not need to be identical to each other. Also, neither the rims nor the mounting flanges need to be identical to each other. In operation, torque and radial loads are transferred directly between the hub 416 and the outboard and inboard rims 422A and 422B via the inner and outer flanges 418 and 420.

Figure 15:
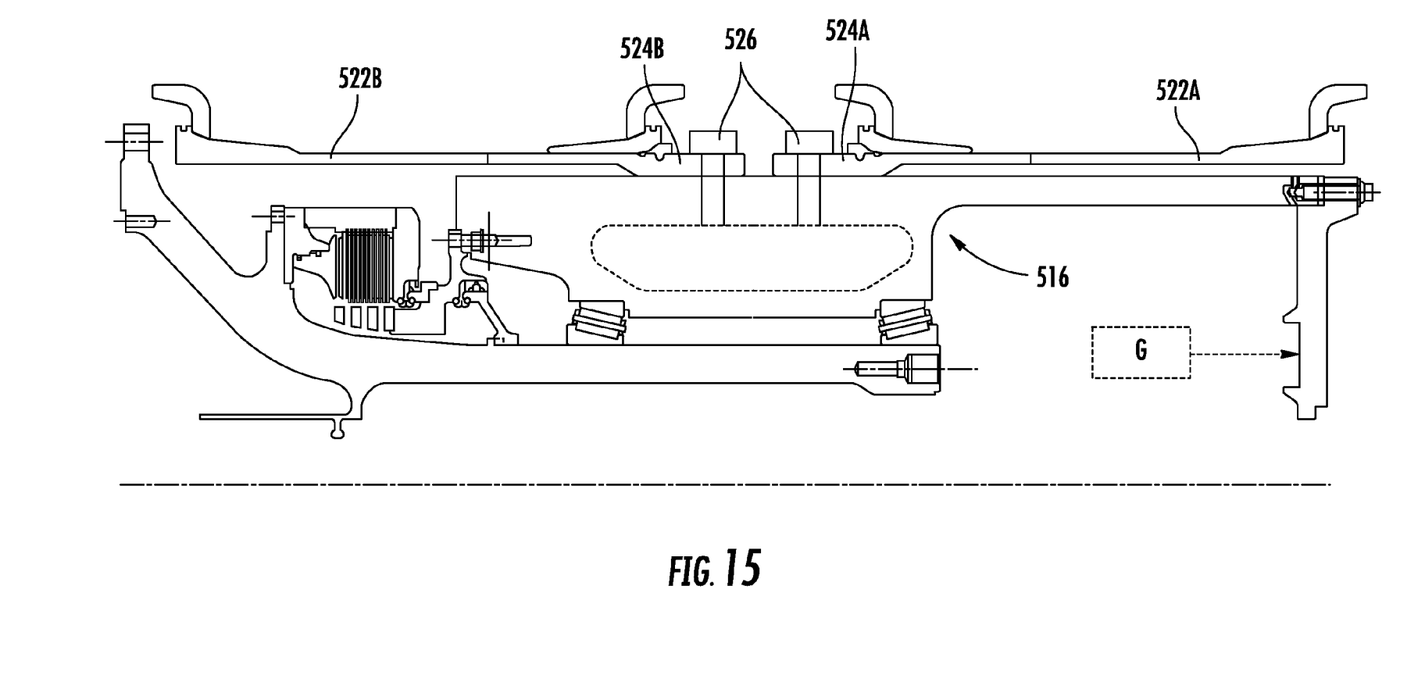
FIG. 15 is a schematic cross-sectional view of a wheel assembly, showing a configuration for mounting a rim thereto according to another aspect of the present invention.

FIG. 15 illustrates a fifth configuration for mounting a rim to a hub 516 similar to the prior art hub 16. FIG. 15 shows an outboard rim 522A and an inboard rim 522B mounted to the hub 516. The rims 522A and 522B do not have a radially-extending mounting flange. Instead, each rim 522A and 522B has an axially-extending mounting flange 524A and 524B, respectively. Unlike the prior art hub 16, the hub 516 maintains its maximum outer diameter all the way out to its outboard end. In this particular example the hub 516 is elongated and defines a space for enclosing a gear set G such that no separate transmission housing is required, but a separate transmission housing could be used. The mounting flanges 524A and 524B are fastened directly to the outer peripheral surface of the hub 516 (e.g., with bolts 526). In operation, torque and radial loads are transferred directly between the hub 516 and the outboard and inboard rims 522A and 522B.

Figure 16:
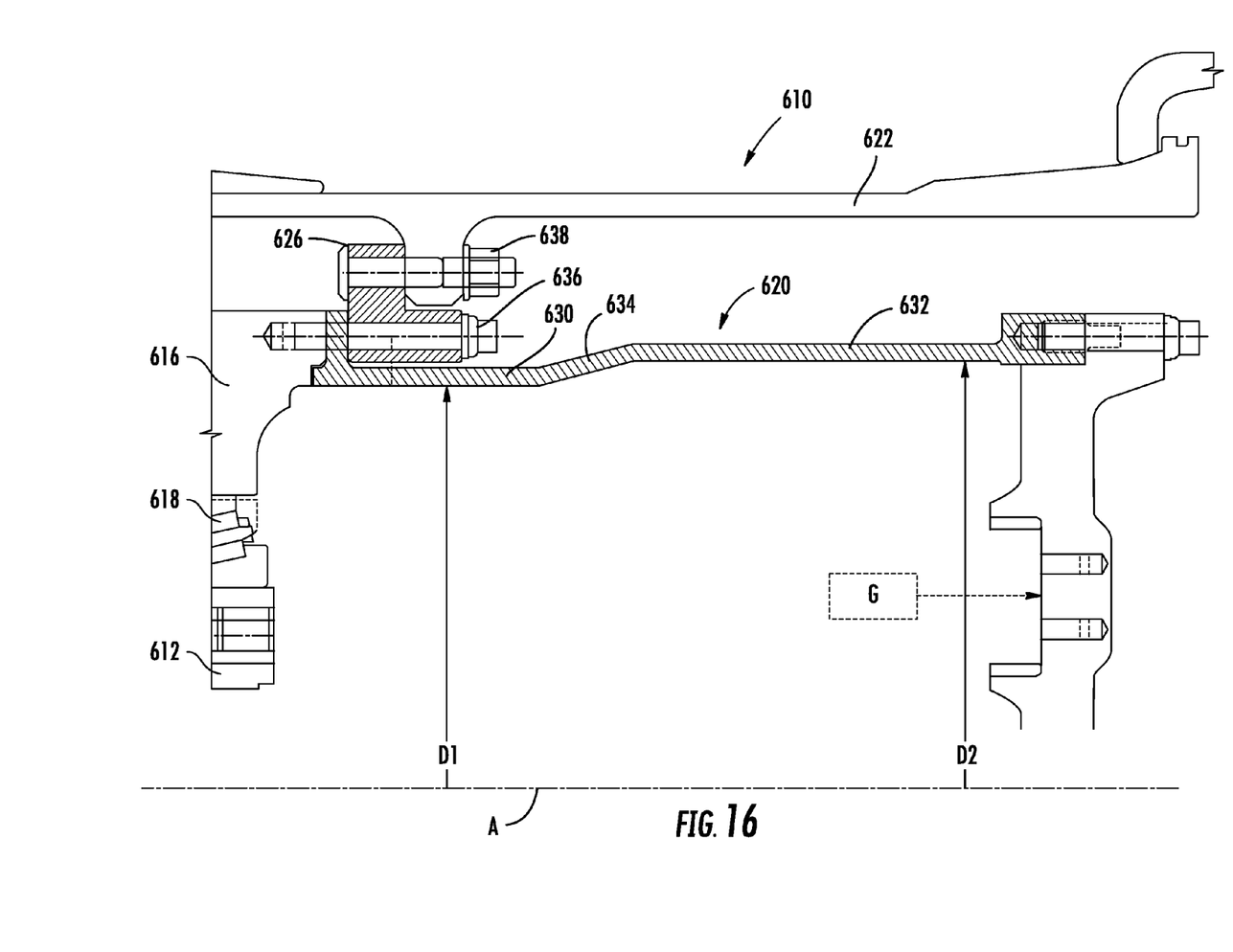
FIG. 16 is a schematic cross-sectional view of a wheel assembly, showing a configuration for mounting a rim thereto according to yet another aspect of the present invention.

FIG. 16 illustrates a sixth configuration for mounting a rim to a hub 616. The configuration is similar to the prior art wheel assembly 10 shown in FIGS. 1 and 2. A wheel hub (or simply "hub") 616 is mounted for rotation on a frame 612 by bearings 618. A generally cylindrical transmission housing 620 is fastened to the outboard end of the hub 616, and encloses a gear set G (shown schematically). As with the other configurations described above, the hub 616 could be elongated to define a space for enclosing the gear set G, such that no separate transmission housing would be required It will be understood that the design of the present invention is equally useful for mounting wheels which use varying types of gear sets, or no gear set at all.

The transmission housing 620 includes an inboard section 630 and an outboard section 632 interconnected by a transition section 634. The inboard section 630 has a first inner diameter "D1" and the outboard section 632 has a second inner diameter "D2" which is substantially greater than the first inner diameter D1. As used herein "substantially greater" means that the second inner diameter D2 is greater that the first inner diameter D1 by an amount which is more than attributable to ordinary variations in manufacturing tolerances. In this example both sections are generally cylindrical, but other shapes may be used as well. The increase in size of the outboard section 632 permits the gearbox G to be larger than that of the prior art transmission housing 20 seen in FIG. 1, allowing it to handle increased torque loads, while utilizing the same size of rim and tire as in the prior art.

An adapter ring 626 is fastened to the outer end of the hub 616 by a mechanical connection, for example with bolts 636. The annular adapter ring 626 is made up of two or more segments so that it can be assembled by bringing the segments in around the transmission housing 620 (i.e., in from a radial direction). A rim 622 (in this case an outboard rim) is fastened to the adapter ring 626 by a mechanical connection, for example with bolts 638. In the illustrated example only the outboard rim 622 is shown. The rim 622 has provisions for mounting a tire, and has an inwardly-extending mounting flange 624, which accepts the bolts 638. An inboard rim (not shown) would be mounted to the hub 616 in conventional fashion as shown in FIG. 1.

The size of the outboard section 632 of the transmission housing 620, while being increased over the prior art, is limited so that it still permits access from the outboard end of the wheel assembly 610 for tools (such as socket wrenches), used to install or remove the bolts 636 and 638, or otherwise access the adapter ring 626. This does not require removing or disassembling the transmission housing 620. In the illustrated example, the second diameter D2 is about 7.6 cm (3.0 in.) greater than the first diameter D1. In the illustrated example the transition section 634 is generally frustoconical in shape, but any convenient cross-sectional profile may be used to achieve the transition.

Although bolts have been illustrated herein for connecting various elements together, other threaded fasteners (or other fasteners generally) could also be used.

The foregoing has described several configurations for mounting a wheel to a hub. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A wheel assembly, comprising:
    a hub adapted to be mounted for rotation about a hub axis, the hub having an inboard end and an outboard end carrying respective inboard and outboard flanges, where at least the outboard flange is segmented into first individual segments that are circumferentially segmented; and
    a generally cylindrical first rim surrounding at least a portion of the hub, the first rim having a radially inwardly extending mounting flange;
    wherein the mounting flange of the first rim is fastened to the inboard flange and is segmented into second individual segments that are circumferentially segmented;
    wherein the first individual segments of the outboard flange are axially offset from each other into different axial planes and wherein the second individual segments of the mounting flange of the first rim are axially offset from each other into different axial planes; and
    wherein the first individual segments of the outboard flange and the second individual segments of the mounting flange are configured to allow the first rim to slide over the outboard flange by axial displacement and rotation about the hub axis, such that the first rim can reach the inboard flange in order to bolt the first rim to the inboard flange.

2. An off-highway vehicle comprising:
    an electric traction motor;

the wheel assembly of claim 1; and a transmission carried within at least one of the wheel assembly or a transmission housing attached to the wheel assembly, the transmission operably connected to the hub so as to transmit torque from the electric traction motor to the hub.

\* \* \* \* \*